UNITED STATES PATENT OFFICE.

AUGUST HAMELBERG, OF SAN DOMINGO, SAN DOMINGO, ASSIGNOR OF ONE-HALF TO HENRY FRANKE, OF BROOKLYN, NEW YORK.

PROCESS OF EXTRACTING JUICE FROM SUGAR-SCUM.

SPECIFICATION forming part of Letters Patent No. 462,095, dated October 27, 1891.

Application filed June 9, 1891. Serial No. 395,664. (No specimens.)

*To all whom it may concern:*

Be it known that I, AUGUST HAMELBERG, a citizen of the United States, and a resident of San Domingo, in the Republic of San Domingo, have invented certain new and useful Improvements in Treating the Scum of Sugar-Cane Juice, of which the following is a specification.

This invention relates to an improvement in treating the scum of sugar-cane juice. To obtain the juice from sugar-canes, the canes are crushed and pressed between the rolls of a cane-mill, or the canes are first shredded and then pressed in a mill; or, to obtain a still better result, the canes that have been already pressed in one mill are conducted to a second mill and pressed again. The juice as it runs from the mill or mills is pumped or forced by steam into the defecators to be clarified and freed from the mechanical and chemical impurities in the following manner: The juice is heated to about 140° Fahrenheit. Then a certain quantity of lime is thrown in and thoroughly stirred and the temperature is permitted to rise to about 180° to 200° Fahrenheit when most of the impurities have come to the surface and form a thick scum. The juice is left in the defecators for about thirty minutes. The clear liquor is then run off, and the muddy liquor, together with the scum, in some sugar-houses, is run into the scum-kettles for the purpose of permitting the scum to separate and to rise to the surface. The clear liquor is drawn off, and the scum, which still contains some liquid matter is run to waste, or in some cases the muddy liquor and scum together are pumped into filter-presses to extract the liquid matter from the solid matter by the pressure of the pump, or it is run through centrifugal machines.

The object of my invention is to extract the liquid matter from the scum, either as it comes from the defecators or scum-kettles, without the use of expensive filtering processes or centrifugal machines.

In carrying out my invention the canes are pressed and repressed in one or more mills for the purpose of extracting the juice, or the canes are first shredded and then pressed and repressed between the rolls of a cane-mill for the same purpose. The juice extracted or pressed in these operations is defecated in the usual manner, and the scum collecting on the surface, together with the muddy liquor, is run into the scum-kettles to be treated as usual, and then run into a tank, or the scum is run directly from the defecators to said tank. The scum collected in said tank is run by pipes or by any suitable means from said tank to a point that the shredded or partially-pressed canes must pass before they are subjected to another pressing, and at said point the scum is distributed in any suitable manner over or upon the shredded or partially-pressed canes. Part of the liquid contained in the scum is absorbed by the shredded or pressed canes and part is retained in the scum. The cane and scum are carried along and subjected to another pressing operation, by which the liquid matter of the scum is extracted from the solid or fibrous particles. This liquid matter extracted from the scum, together with the extracted juice of the canes, is again pumped into the defecators and treated as first mentioned, the solid or fibrous particles of the scum passing along with the cane trash or megasse. The liquid matter contained in the scum is thus obtained without any additional expense, and filtering-presses or centrifugal machines, which are very expensive and require much power and expensive attendance, can thus be dispensed with.

My improved method of treating sugar-cane-juice scum does not require any change in the machinery or any additional expense for running the same with any plant.

Having thus described my invention, I claim as new and desire to secure by Letters Patent—

The method herein described of treating the scum of sugar-cane juice, consisting in distributing the scum previously obtained from cane-juice over the shredded or partially-pressed canes and then subjecting said canes to another pressing operation, substantially as set forth.

In testimony that I claim the foregoing as my invention I have signed my name in presence of two subscribing witnesses.

AUGUST HAMELBERG.

Witnesses:
OSCAR F. GUNZ,
A. M. BAKER.